Jan. 19, 1937.  G. L. MOREHEAD  2,068,428
SETTLING TANK
Filed April 17, 1933  3 Sheets-Sheet 1
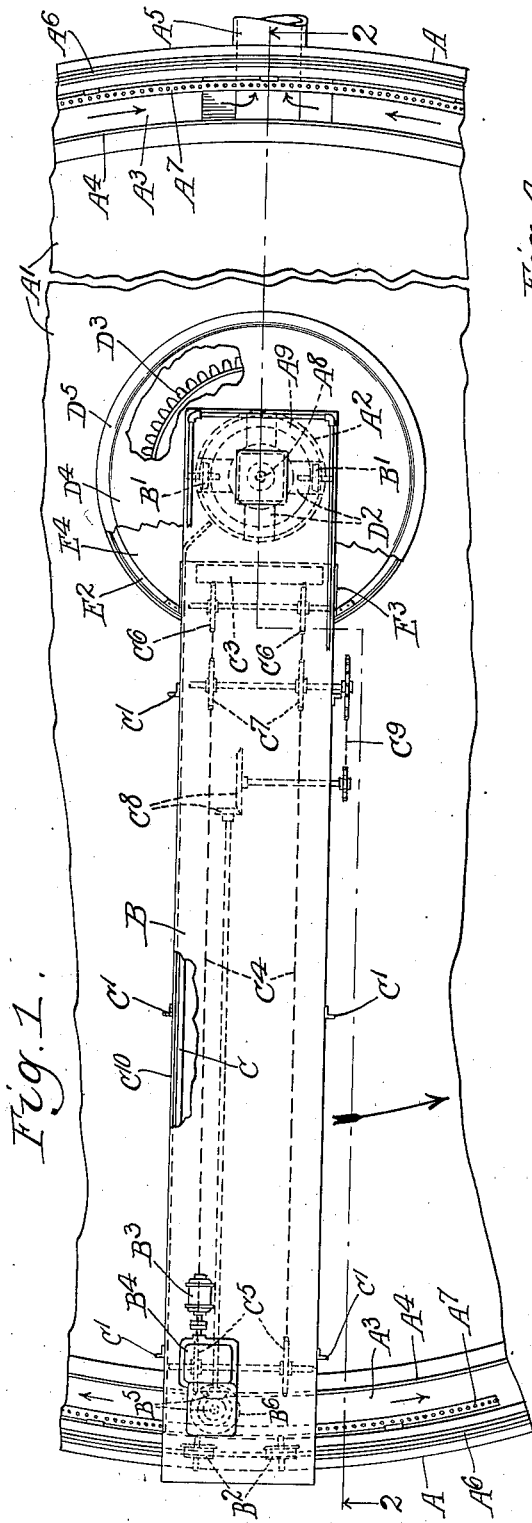
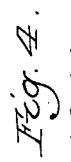
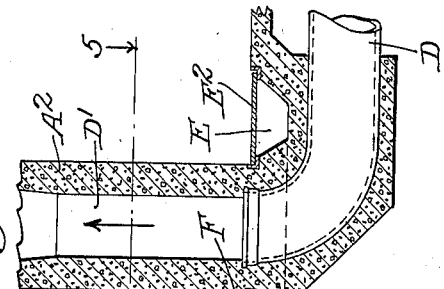
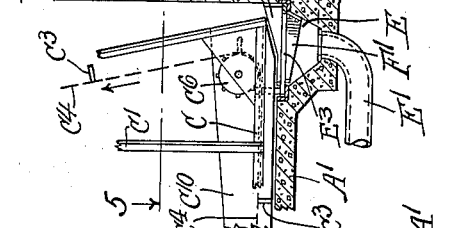
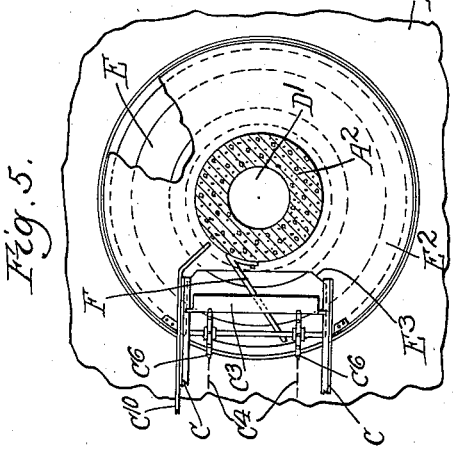
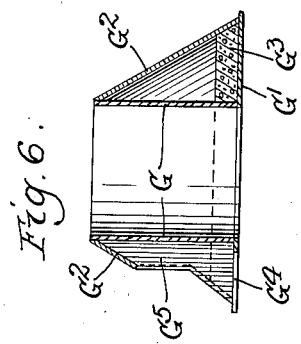
Inventor
George L. Morehead
by Parker & Carter
Attorneys.

Jan. 19, 1937. G. L. MOREHEAD 2,068,428
SETTLING TANK
Filed April 17, 1933 3 Sheets-Sheet 2
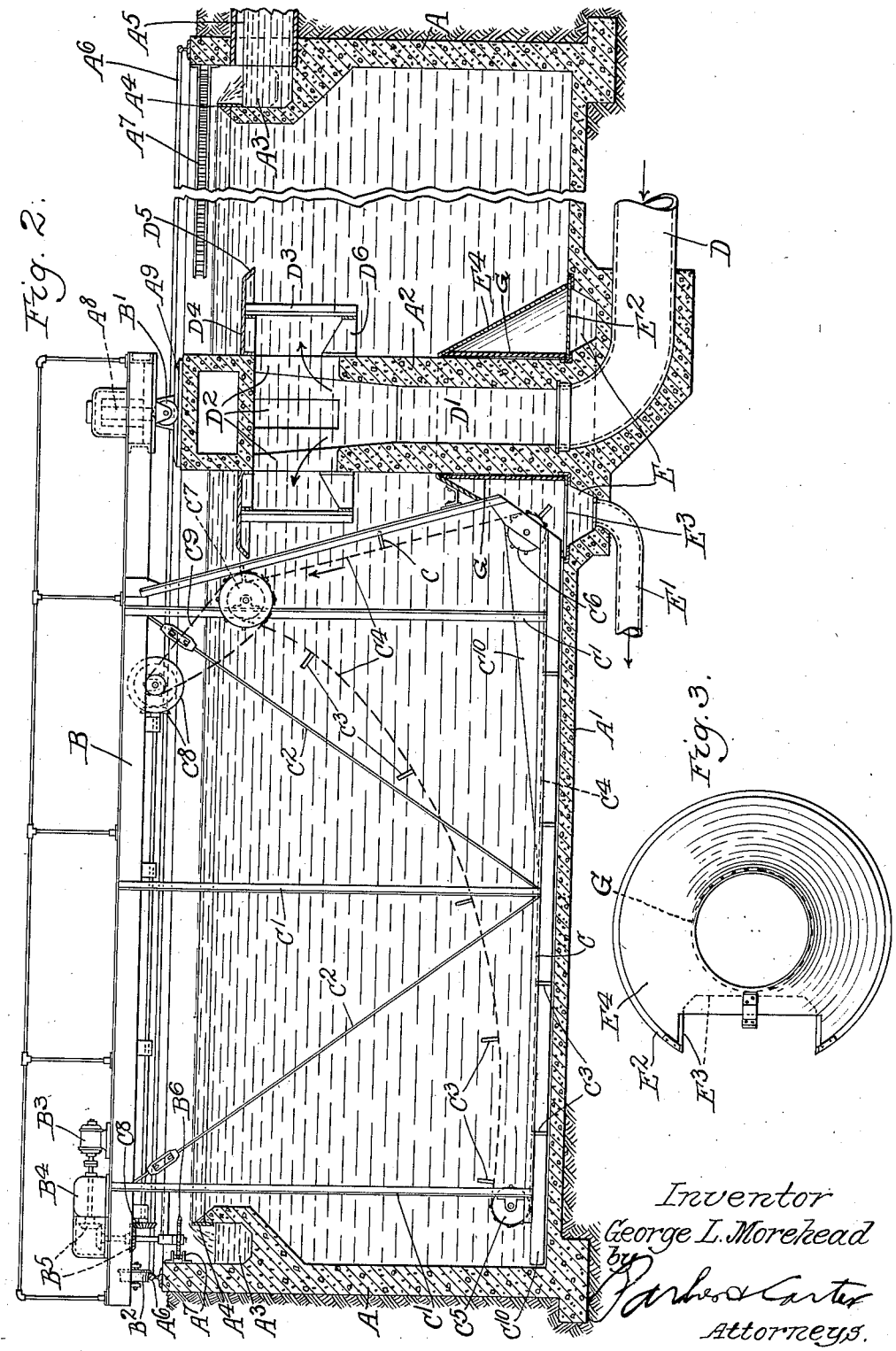
Inventor
George L. Morehead
by
Barker & Carter
Attorneys.

Jan. 19, 1937. G. L. MOREHEAD 2,068,428
SETTLING TANK
Filed April 17, 1933 3 Sheets-Sheet 3

Inventor
George L. Morehead
by Parker Carter
Attorneys.

Patented Jan. 19, 1937

2,068,428

UNITED STATES PATENT OFFICE 2,068,428

SETTLING TANK

George L. Morehead, Philadelphia, Pa., assignor to Link-Belt Company, Chicago, Ill., a corporation of Illinois Application April 17, 1933, Serial No. 666,449

27 Claims. (Cl. 210—3)

My invention relates to improvements in settling tanks for sewage and the like and has for one object to provide new and improved means for introducing effluent into and withdrawing the sludge from a settling tank.

I have illustrated my invention in connection with a circular sewage tank though it will be obvious that other shapes of tank might be used with equal satisfaction. In settling tanks it will be understood that it is essential to introduce the influent containing material to be settled out in a fairly uniform flow with a minimum of eddy currents and to so distribute the liquid that it travels through the tank at a relatively low velocity, so that the solids may settle out and it is equally obvious that all the sludge which does settle must be recovered and discharged through some satisfactory discharge opening with a minimum of disturbance because the sludge is light and must be handled gently to prevent stirring and eddy currents which would agitate it and cause it to go back into suspension. My invention, therefore, consists primarily in introducing influent into the tank at a point substantially below the surface of the liquid therein, controlling and guiding the influent as it spreads out through the body of the liquid so as to produce a minimum of disturbance, allowing the solids to settle, withdrawing the effluent from a point above the point at which the influent enters at a point far removed from the entry point and far removed from the settled sludge discharge point. Another object of the invention is to direct the flow of the influent downward as it enters the tank so that the suspended solids whose specific gravity is greater than the liquid will be started downward by the flow of the liquid in the general direction which they are to follow as they settle out so that they may keep traveling downwardly during their entire travel through the tank until they reach the bottom, while of course the liquid will subsequently flow in a generally horizontal direction toward the effluent weir. Other objects will appear from time to time throughout the specification and claims.

My invention is illustrated more or less diagrammatically in the accompanying drawings, wherein—

Figure 1 is a plan view;

Figure 2 is a section along the line 2—2 of Figure 1;

Figure 3 is a plan view of the sludge deflector cone;

Figure 4 is a detail section through a modified form of sludge discharge;

Figure 5 is a section along the line 5—5 of Figure 4;

Figure 6 is a detail vertical section through the sludge cone;

Like parts are indicated by like characters throughout the specification and drawings.

Figure 7:
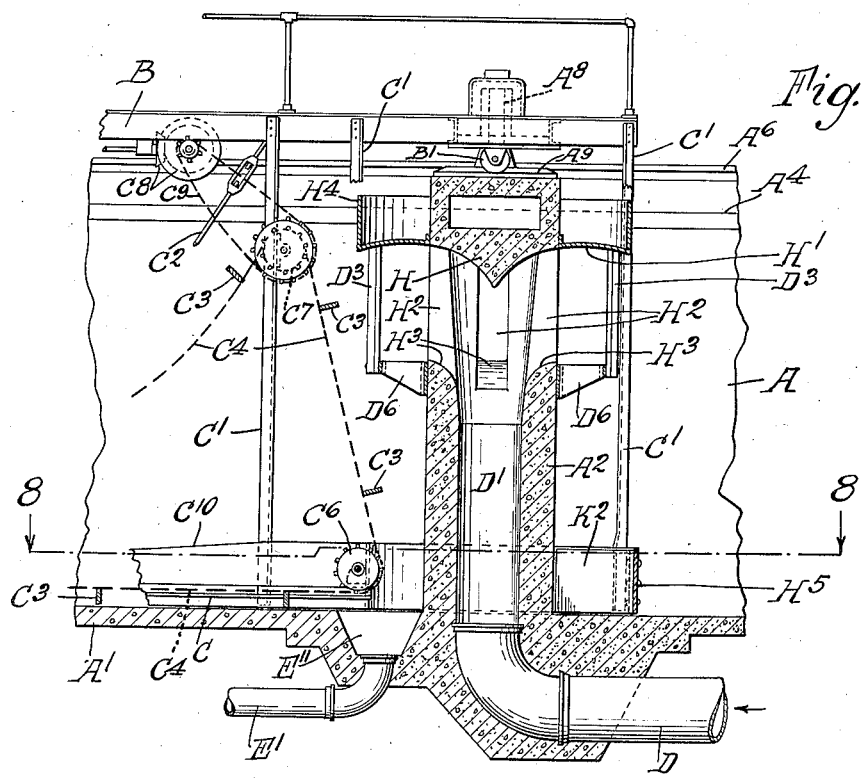
Figure 7 is a partial vertical section similar to Figure 2 of a variant form.

The circular settling tank comprises side walls A, a floor $A^1$ which may be horizontal or inclined, in whole or in part as the case may be. A central hollow upstanding pier $A^2$, which pier, of course, is shown preferably at the center of the tank but may be eccentric. About the inner periphery of the tank is formed an effluent channel $A^3$ having an adjustable weir $A^4$ and communicating with an effluent discharge pipe $A^5$. Supported on the wall is a track $A^6$. $A^7$ is a rack on the inner periphery of the wall adjacent the top. $A^8$ is a pivot pin projecting upwardly from the pier $A^2$ and concentric with the peripheral track and rack and $A^9$ is a roller race on the pier concentric with the pin $A^8$.

B is a bridge pivoted on the pin $A^8$ having rollers $B^1$ adapted to travel along the roller race $A^9$. The outer extremity of this bridge is supported on track wheels $B^2$ adapted to travel along the track $A^6$. $B^3$ is a motor. $B^4$ is a speed reducing gear. $B^5$ represents a gear train terminating in a rack gear $B^6$ in mesh with the rack $A^7$ whereby the motor may cause the bridge to revolve about its pivot $A^8$ traveling at its outer end along the track so that the bridge sweeps the entire area of the tank.

C is a conveyor ladder supported from the bridge by means of vertical members $C^1$ and stay members $C^2$. This ladder is thus supported immediately above the bottom of the tank and carries a conveyor comprising flights $C^3$ supported by a chain $C^4$ which chain travels over sprockets $C^5$ $C^6$ $C^7$. No take-up is needed for this chain because the portion of chain extending between the sprockets $C^5$, $C^7$ hangs in a catenary. The ladder supports the chain between the sprocket $C^5$ and sprocket $C^6$ so that the relationship between the working part of the chain and the floor of the tank is maintained constant. The conveyor is driven by means of a gear train $C^8$ and a sprocket chain $C^9$ by the motor $B^3$ and it will be understood that in the preferred form the conveyor flights move from the sprocket $C^5$ to the sprocket $C^6$ inwardly toward the center of the pier.

D is an influent pipe beneath the bottom of the tank. It communicates with the hollow interior $D^1$ of the pier $A^2$. Ports $D^2$ toward the upper end of the pier but substantially below the weir $A^4$ and so substantially below the liquid level of the tank permit the discharge of the influent into the tank. Surrounding the ported portion of the pier is an apertured cage $D^3$ closed at the top as at $D^4$ which closure extends outwardly beyond the periphery of the cage and is downwardly disposed as at $D^5$ to guide the effluent, as it discharges, toward the bottom of the tank and away from the upper surface. The lower portion of the cage is open as at $D^6$ so that sludge bearing effluent may discharge radially and be guided downwardly by the deflector $D^5$ and may also be discharged downwardly along the pier.

Concentric with the pier $A^2$ in the floor of the tank is a sludge trough E which communicates with a sludge pipe $E^1$, and is closed by a flat annular cover plate $E^2$, which plate is cut away as indicated at $E^3$ in register with the conveyor so that material moved inwardly by the conveyor may be discharged into the trough E and thereafter will be retained by the flat cover plate $E^2$. $E^4$ is a deflector cone extending upwardly from the outer periphery of the plate $E^2$ and encircling the pier. This cone and plate are both supported on the bridge B and ladder C so that they rotate with them. G is a sleeve encircling and making a close working fit with the pier attached at its upper end to the upper extremity of the cone $E^4$ and at its lower end to the inner periphery of the cover plate $E^2$. The closed chamber thus formed may, if necessary, be ballasted to prevent danger of flotation, the aperture $E^3$ being in register with a recessed portion of the cone $E^4$ whereby in effect a chute or hopper is formed in register with the conveyor so that the material fed forward by the conveyor flights will all be forced into this hopper and passed down through the aperture $E^3$ into the trough E, the sludge being discharged by the conveyor into the space beneath the flat plate. It will be understood, of course, that as the sludge settles in the tank, the bridge slowly rotates and gradually sweeps the tank floor, the conveyor flights moving the settling material inwardly where it is discharged into the closed conduit formed by the sludge trough and its flat cover. There will be a flow of sludge then through this closed conduit, out through the sludge discharge pipe and the closure of the conduit concentrates the flow so that no means other than the moving current of liquid are needed to withdraw the sludge from the sludge trough irrespective of the point at which it is deposited by the conveyor as it sweeps around the tank.

In the modified form shown in Figures 4 and 5, the conical deflector is dispensed with. In this case, sludge will be deposited upon the flat cover plate $E^2$ and might remain there to cause a septic condition. This is prevented by the fixed scraper blade F mounted on the pier, extending out peripherally above the surface of the revolving plate or ring $E^2$. This blade is low enough to clear the conveyor flights and as the plate $E^2$ revolves, material accumulated thereon will be piled up in front of the blade F until the aperture $E^3$ comes in register with the blade, when such material will flow downwardly into the sludge trough or hopper.

$F^1$ is a fixed scraper blade extending across the hopper or trough E immediately beneath the cover plate $E^2$ so that as that cover plate rotates, this blade will scrape or clear the underside thereof to avoid the danger of a deposit of floating material such as grease and the like on the underside of the plate.

Figure 8:
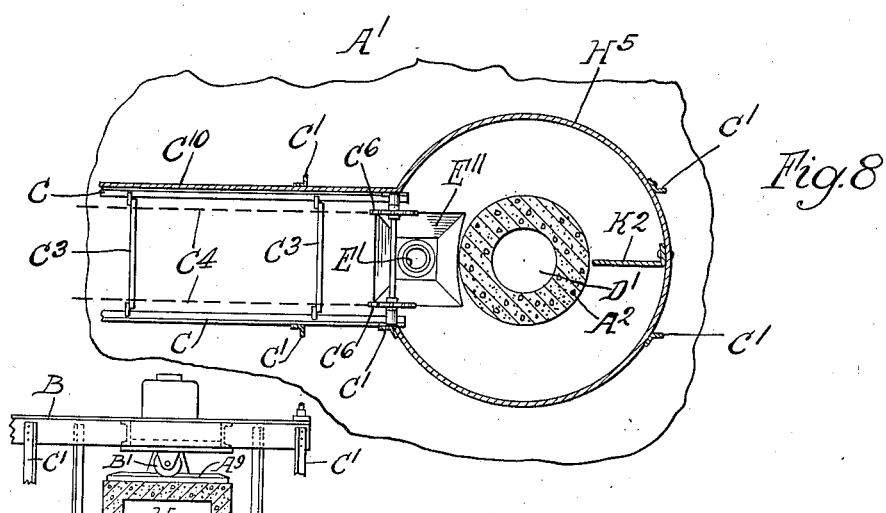
Figure 8 is a section along the line 8—8 of Figure 7.

The devices shown in Figures 7 and 8, in general are the same as the device shown in Figure 2 except that it will be noted that the upper inner portion of the pier is formed in a curved cone as indicated at H, which cone is continued by the curved deflector $H^1$. Also the lower boundaries of the ports $H^2$ are formed on curves as indicated at $H^3$ so that the influent will wipe across and be guided by these curved surfaces, thus avoiding the danger of deposit of floating material like greases, fat and the like on either the upper or lower boundaries. The device may be made with or without the cage $D^3$. In order to avoid deposit of settling material on the upper surface of the deflector $H^1$, it is provided with an annular ring or wall $H^4$ which extends up above the liquid level. $H^5$ is an annular guard plate encircling the pier and adjacent the outer periphery of the sump $E^{11}$. This guard ring extends clear around so that at one end it is joined to the screed and at the other end terminates on the ladder, the conveyor blades as they urge settling material inwardly tend to exert a pressure to cause movement of material a considerable distance ahead of themselves. Such movement might tend to force the settling sludge clear across beyond the sludge trough. This annular guard ring makes this impossible and insures that the settling and settled material urged forwardly by the conveyor flights will be kept inside of the ring and brought to the sludge sump or hopper E.

My invention relating as it does to the handling of settling material, I have used the term "settling" in a rather general and broad sense. The conveyor works on material which may have actually settled or on material which is in the process of settling and by settling in the specification and claims I want it understood that I tend to mean material which has actually settled out or down upon the bottom of the tank or material which is in the process of settling down or out. It will be understood that the scraper blade associated with the cover plate is necessary on the bottom or in the absence of the conical deflector is necessary on the top because we are likely to have an accumulation of settling material heavier than the liquid on any horizontal surface which is exposed to it and we are equally likely to have the deposit of other material on the underside of any horizontal surface, this latter material may be sludged grease, fat and such material. All such materials must be kept in motion and removed from the point where they are collected to prevent septic action.

Figure 9:
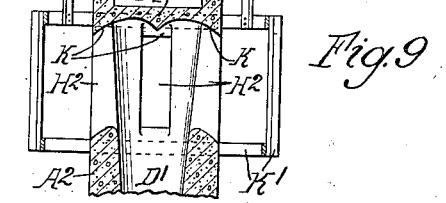
Figure 9 is a detail section showing a modification of the form shown in Figure 7.

In the modified form shown in Figure 9, the deflector $H^1$ is omitted and there is substituted for the upwardly curved surface bounding the upper portion of the discharge outlet the recurved surface K which itself without the interposition of any other external deflector tends to deflect the influent downwardly as it leaves the discharge ports. In this case the diffuser drum or cage $K^1$ is supported from the bridge and rotates with it though it will be understood that this drum may if desired be dispensed with. In Figure 8, $K^2$ is a plow which extends from the ring $H^5$ inwardly toward the pier and tends to convey the sludge around the pier to discharge it into the sludge sump or hopper $E^{11}$.

I claim:
1. In a settling tank, means for maintaining the liquid therein at a fixed level, means for introducing influent liquid thereto at a point substantially below the liquid level and means for directing the liquid from the place of introduction along a path away from the surface of the liquid, said means including a plurality of ports, an apertured cage encircling and spaced from said ports and a deflector below the surface of the liquid closing the upper portion of the cage projecting peripherally away from it and inclined downwardly away from the level of the liquid.

2. In a settling tank, means for maintaining the liquid therein at a fixed level, means for introducing influent liquid thereto at a point substantially below the liquid level and means for directing the liquid from the place of introduction along a path away from the surface of the liquid, said means including a plurality of ports, an apertured cage encircling and spaced from said ports and a deflector below the surface of the liquid closing the upper portion of the cage projecting peripherally away from it and inclined downwardly away from the level of the liquid, the cage being open at the bottom.

3. In a settling tank, means for maintaining the liquid therein at a fixed level, means for introducing influent liquid thereto at a point substantially below the liquid level and means for directing the liquid from the place of introduction along a path away from the surface of the liquid, the directing means comprising a guide plate located above the highest point of inflow of the liquid and extending downwardly into the path of such flow.

4. In a settling tank, a pier projecting upwardly at a point removed from the walls thereof and containing an influent conduit, a weir over which the effluent may discharge, a port in the wall of the pier communicating with the influent conduit at a level substantially below the level of the weir, and a deflector located above the port adapted to deflect the influent downwardly from the surface of the liquid in the tank.

5. In a settling tank, a pier projecting upwardly at a point removed from the walls thereof and containing an influent conduit, a weir over which the effluent may discharge, a port in the wall of the pier communicating with the influent conduit the top of the port being at a level substantially below the level of the weir, an apertured cage encircling the pier in line with the port the cage terminating at its bottom at a point well above the bottom of the tank, a closure for the top of the cage, the bottom being open.

6. In a settling tank, a pier projecting upwardly at a point removed from the walls thereof and containing an influent conduit, a weir over which the effluent may discharge, a port in the wall of the pier communicating with the influent conduit at a level substantially below the level of the weir, an apertured cage encircling the pier in line with the port, a closure for the top of the cage, the bottom being open, a deflector in alignment with the closure at the top and extending downwardly from the top of the cage into the path of the influent.

7. In a settling tank, an annular sludge receiving trough located below the bottom thereof and means for withdrawing sludge therefrom, an apertured closure for the trough, movable means for conveying settling material in the tank towards and discharging it into the aperture in the closure.

8. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means.

9. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means, the closure comprising an annular cover plate substantially in line with the bottom of the tank and means for preventing the accumulation of material upon the horizontal cover plate.

10. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means, the closure comprising an annular cover plate substantially in line with the bottom of the tank and means for preventing the accumulation of material upon the horizontal cover plate, said means comprising a fixed blade adjacent to the plate.

11. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means, the closure comprising an annular plate substantially in line with the bottom of the tank and means for preventing the accumulation of material upon the horizontal cover plate, said means comprising a conical deflector plate projecting upwardly from the outer periphery of the closure and terminating at its upper extremity generally above the inner periphery of the closure.

12. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means whereby the aperture is always in register with such means, the closure comprising an annular plate substantially in line with the bottom of the tank and means for preventing the accumulation of sludge upon the upper side of the closure, said means comprising a conical deflector plate projecting upwardly from the outer periphery of the closure and terminating at its upper extremity generally above the inner periphery of the closure, a sleeve joining the inner periphery of the closure and the upper termination of the deflector plate.

13. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means whereby the aperture is always in register with such means, the closure comprising an annular cover plate substantially in line with the bottom of the tank and means for preventing the accumulation of sludge upon the upper side of the closure, said means comprising a conical deflector plate projecting upwardly from the outer periphery of the closure and terminating at its upper extremity generally above the inner periphery of the closure, the conical deflector plate being cut away in register with the aperture.

14. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means whereby the aperture is always in register with such means, the closure comprising an annular cover plate substantially in line with the bottom of the tank and means for preventing the accumulation of sludge upon the upper side of the closure, said means comprising a conical deflector plate projecting upwardly from the outer periphery of the closure and terminating at its upper extremity generally above the inner periphery of the closure, a sleeve joining the inner periphery of the closure and the upper termination of the deflector plate, the deflector plate being cut away in register with the aperture.

15. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means whereby the aperture is always in register with such means, the closure comprising an annular cover plate substantially in line with the bottom of the tank and means for preventing the accumulation of sludge upon the cover plate comprising a fixed blade immediately adjacent a horizontal surface thereof, the movable means including a conveyor having a plurality of flights and means for moving said flights toward the aperture, the blade being adapted to scrape deposited material off of the cover plate.

16. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means whereby the aperture is always in register with such means, the closure comprising an annular cover plate substantially in line with the bottom of the tank and means for preventing the accumulation of sludge upon the cover plate comprising a conical deflector plate projecting upwardly from the outer periphery of the closure and terminating at its upper extremity generally above the inner periphery of the closure, the conveying means comprising a conveyor having flights and means for moving them successively toward the trough.

17. In a settling tank, an annular sludge receiving trough located below the bottom thereof and means for withdrawing sludge therefrom, an apertured closure for the trough, movable means for conveying settling material in the tank and discharging it into the aperture in the closure, the closure being adapted to move with the conveying means, the closure comprising an annular cover plate substantially in line with the bottom of the tank and means for preventing the accumulation of sludge upon the cover plate, said means comprising a conical deflector plate projecting upwardly from the outer periphery of the closure and terminating at its upper extremity generally above the inner periphery of the closure, a sleeve joining the inner periphery of the closure and the upper termination of the deflector plate, the conveying means comprising a conveyor having flights and means for moving them toward the trough, the deflector being cut away at the aperture in the closure.

18. In a settling tank, an annular sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means, the closure comprising an annular cover plate substantially in line with the bottom of the tank and means for preventing the accumulation of material upon the horizontal cover plate, said means comprising a conical deflector plate projecting upwardly from the outer periphery of the closure and terminating at its upper extremity generally above the inner periphery of the closure and a fixed blade adjacent the underside of the cover plate.

19. In a settling tank, means for maintaining the liquid therein at a fixed level, means for introducing influent liquid thereto at a point substantially below the liquid level and means for directing the liquid from the place of introduction along a path away from the surface of the liquid, said directing means including a plurality of ports and a deflector associated with said ports in the path of the fluid having a surface downwardly inclined from the point of the influent.

20. In a settling tank, a ladder mounted to revolve about a vertical axis, conveyor flights on said ladder and means for displacing them inwardly toward the center of revolution, a guard ring mounted on the ladder concentric with the center of revolution and in line with the conveyor flights, a sludge sump enclosed within the periphery of the ring.

21. In a settling tank, a ladder mounted to revolve about a vertical axis, conveyor flights on said ladder and means for displacing them inwardly toward the center of revolution, a guard ring mounted on the ladder concentric with the center of revolution and in line with the conveyor flights, a sludge sump enclosed within the periphery of the ring, a scraper carried by the ring on the side thereof opposed to the conveyors and adapted to convey material caught within the ring toward the sludge sump.

22. In a settling tank, an annular sludge receiving trough located below the bottom thereof and means for withdrawing sludge therefrom, a horizontally disposed apertured closure for the trough, movable means for conveying settling material in the tank towards and discharging it into the aperture in the closure.

23. In a settling tank, an annular sludge receiving trough located below the bottom thereof and means for withdrawing sludge therefrom, a horizontally disposed apertured closure for the trough, movable means for conveying settling material in the tank towards and discharging it into the aperture in the closure, the closure being adapted to move with the conveying means.

24. In a settling tank, an annular sludge receiving trough located below the bottom thereof and means for withdrawing sludge therefrom, a horizontally disposed apertured closure for the trough, movable means for conveying settling material in the tank towards and discharging it into the aperture in the closure, the closure being adapted to move with the conveying means, the closure comprising a cover plate substantially in line with the bottom of the tank and means for preventing the accumulation of material upon the horizontal cover plate.

25. In a settling tank, an annular sludge receiving trough located below the bottom thereof and means for withdrawing sludge therefrom, a horizontally disposed apertured closure for the trough, movable means for conveying settling material in the tank towards and discharging it into the aperture in the closure, the closure being adapted to move with the conveying means, the closure comprising a cover plate substantially in line with the bottom of the tank and means for preventing the accumulation of material upon the apertured closure plate, said means comprising a fixed blade adjacent to the plate.

26. In a settling tank, a sludge receiving trough located below the bottom thereof and means for withdrawing sludge therefrom, an apertured closure for the trough, movable means for conveying settling material in the tank towards and discharging it into the aperture in the closure, the closure being adapted to move with the conveying means whereby the aperture is always in register with such means, the closure comprising a cover plate substantially in line with the bottom of the tank and means for preventing the accumulation of sludge upon the cover plate comprising a fixed blade immediately adjacent a horizontal surface thereof, the movable means including a conveyor having a plurality of flights and means for moving said flights toward the aperture, the blade being adapted to scrape deposited material off of the cover plate.

27. In a settling tank, an annular sludge hopper at the bottom thereof, a cylindrical ring projecting above the bottom of the tank and encircling the outer periphery of the hopper and means for discharging sludge along the bottom of the tank in a radial direction into the hopper, the ring being apertured in line with the sludge discharging means.

GEORGE L. MOREHEAD.